May 8, 1945.  C. E. METHENY ET AL  2,375,574
APPARATUS FOR FABRICATING CONNECTING RODS
Filed Dec. 30, 1942
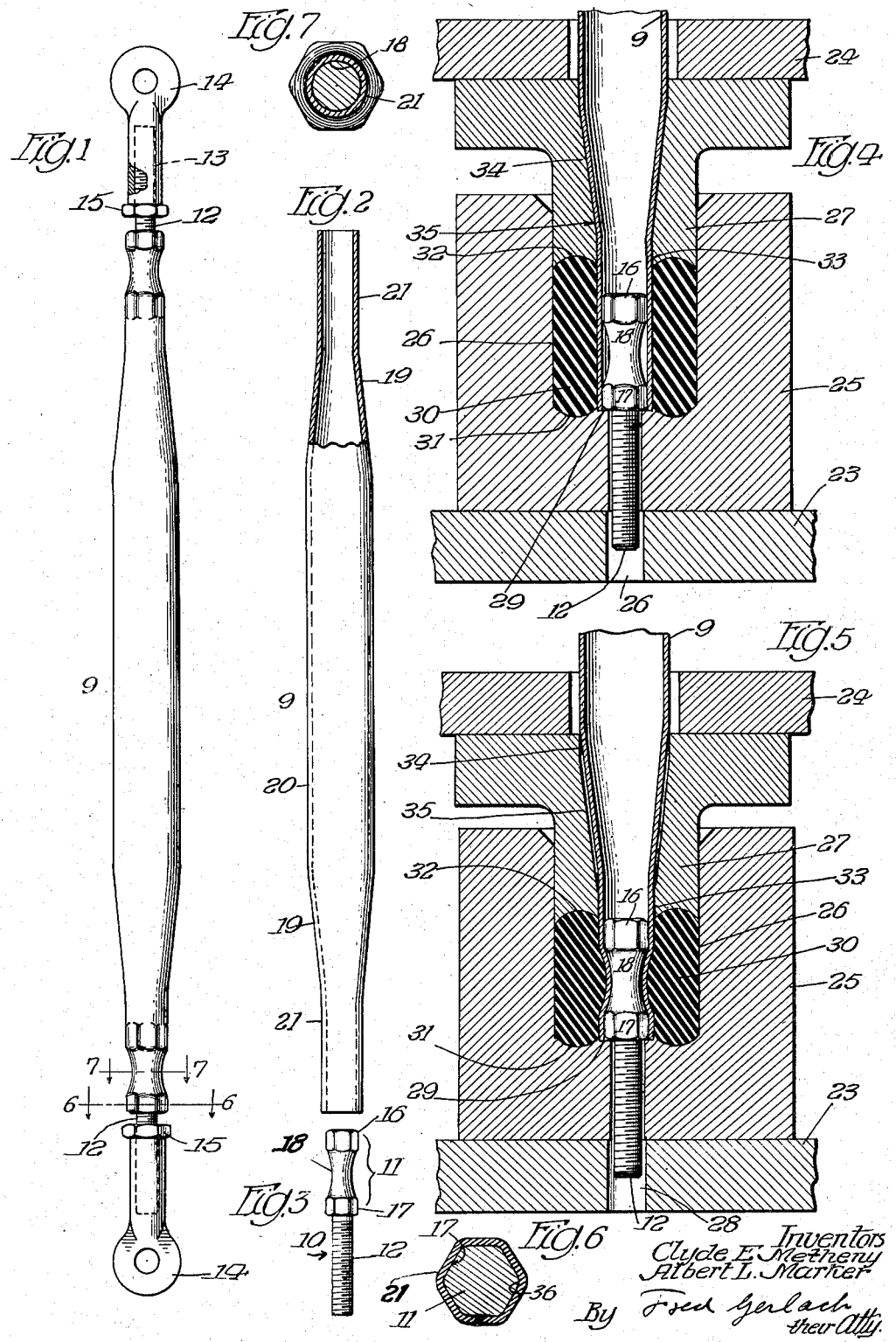
Inventors
Clyde E. Metheny
Albert L. Marker
By Fred Gerlach
their Atty.

Patented May 8, 1945

2,375,574

UNITED STATES PATENT OFFICE 2,375,574

APPARATUS FOR FABRICATING CONNECTING RODS

Clyde E. Metheny and Albert L. Marker, San Diego, Calif., assignors to Consolidated Aircraft Corporation, San Diego, Calif., a corporation of Delaware Application December 30, 1942, Serial No. 470,572

8 Claims. (Cl. 153—1)

The invention relates to rods for operating devices, and the fabrication thereof.

Push-rods are employed, in connection with aircraft, for operating control surfaces, engine controls and other devices. These rods, in many instances, are required to transmit relatively great loads axially and in torsion, and are usually provided with terminals whereby the rods are connected to the shifting and shifted elements. Heretofore it has been customary to secure the terminals in the ends of tubing by keying the terminals in the tubing with rivets or bolts which pass through the tubing and the terminals to provide for the transmission of loads axially and in torsion. This construction results in shear stresses on the rivets or bolts. In operating rods in aircraft a substantial factor of safety and lightness in weight are desiderata.

The object of the present invention is to provide apparatus for connecting the terminals and the tubing for operating rods in which such shear stresses are eliminated.

Another object of the invention is to provide apparatus for connecting tubing and terminals for operating rods of this type in which the tubing and terminals are positively interlocked for the transmission of loads axially and in torsion by integral parts.

Other objects of the invention will appear from the detailed description.

The invention consists in the several novel features which are hereinafter set forth and more particularly defined by claims at the conclusion hereof.

In the drawing:

Fig. 1 is a plan of a connecting rod made in accordance with the present invention.

Fig. 2 is a plan of the tubular member before the terminals have been attached thereto.

Fig. 3 is a plan of one of the terminals.

Fig. 4 is a sectional view of a tubular member and a terminal in a press before the latter is operated to secure the tubular member and the terminal together.

Fig. 5 is a similar view illustrating the tubular member and terminal after the press has been operated to interlock the terminal and the tubular member.

Fig. 6 is a section taken on line 6—6 of Fig. 1.

Fig. 7 is a section taken on line 7—7 of Fig. 1.

The invention is exemplified in an apparatus for fabricating an operating rod which comprises a tubular member 9 having a terminal 10 secured in each end thereof. Each terminal 10 comprises an outwardly extending screw-threaded stem 12 to which an internally threaded socket 13 of an eye 14 is connected. A lock nut 15 is usually used to secure the eye 14 on the stem 12. Each terminal comprises a head 11 which is adapted to fit into the end of the tubular member, and is provided with peripheral portions 16 and 17, preferably of polygonal shape as herein shown, but which may in some cases be knurled, serrated, or otherwise roughened, and a portion 18 having a concave periphery between the portions 16 and 17. The head 11 is integral with the stem 12.

In fabricating the rod the ends of a section of tubing of metal, such as aluminum, steel, or other suitable alloy, are swaged to provide at each end a tapered portion 19 extending from the portion 20 of the normal diameter of the tubing and a cylindrical outer end portion 21 of reduced diameter into which the portions 16, 17 and 18 of the terminals 10 are secured in the manner next described. Each terminal is formed from a hexagonal rod of suitable material, such as steel, which is machined to provide it with the screw-threaded stem 12 of reduced diameter and the portion 18 with its concave periphery. The terminals and tubing are secured together by deforming the end portions of the tubing into axial and torsional interlocking relation with the heads on the terminals.

The cylindrical end-portions 21 of the tubing are swaged to an internal diameter corresponding substantially to the greatest thickness of the hexagonal portions 16 and 17 to minimize the deformation required for interlocking the heads and the tubular member and yet to provide rigidity in the body 20. The concave periphery of portion 18 is formed on a curve of sufficient radius to permit the tubing to be deformed so as to fit into and around said concave portion and to produce a positive axial interlock between the tubular member and the head. The deformation of the tubing around the periphery of the polygonal periphery of portions 16 and 17 produces circumferential interlocking between the tubular member and the head at portions spaced apart sufficiently to interlock the tubular member and head against bending.

The deforming operation of the tubular member is performed in a suitable press which usually comprises platens 23, 24, one of which is movable relatively to the other and is adapted to be operated by pressure, usually pneumatically or hydraulically. The deformation of the tubular member is effected in a press within a cylinder formed in the casing 25, which is supported on the platen 23. This cylinder is provided with a cylindrical bore 26 and a piston 27 is slidably fitted in the cylindrical bore and adapted to be forced into the cylinder by the movement of the platen 24. The deformation of the tubular member is effected in the press by the compression of a ring 30 of suitable rubber or rubber-like elastic material of a Shore hardness of about 60 to 70 which is confined in the lower portion of the bore 26 of the cylinder, and is adapted to be squeezed sufficiently to force the wall of the tubular member to conform to, and into close fitting relation with, the portions 16, 17 and 18 of the head of a terminal.

The bottom of casing 25 is provided with an opening 28 for receiving the stem 12 of the terminal and a shallow cylindrical recess 29 around said opening within which the outer shoulder of the hexagonal portion 17 and one end of cylindrical portion 21 of tubular member 20 are adapted to seat. The bore of ring 30 normally is sufficient to receive one end portion 21 of the tubular member 9. Around recess 29 the bottom of the cylinder is toroidally grooved, as at 31. The opposed face of the piston 27 is also toroidally grooved, as at 32. The piston 27 has a bore with a cylindrical portion 33 at its lower end which fits snugly around the cylindrical portion 21 of the tubular member 9, an upper end 34 which fits snugly around the cylindrical portion 20 of the tubular member and a flared portion 35 between portions 33 and 34.

In carrying out the method for attaching each terminal 10 to one of the ends of the tubular member, the stem 12 is dropped, while piston 27 is raised and while ring 30 is not compressed, through the hole 28 in the bottom of casing 25 so that the outer end face of hexagonal portion 17 will rest in recess 29. The reduced cylindrical end portion 21 of tubular member 9 is then passed through the piston and the bore of the elastic ring 30 so it will rest in recess 29 around the portions 17 and 18 of the terminal 10. Next the press is operated to force the piston downwardly and squeeze the elastic ring 30 with sufficient force to deform by fluid pressure the tubular portion 21 of member 9 into closely fitting relation with all of said portions of the head 11 of the terminal so it will fit the hexagonal portions 16 and 17 and the concavely shaped portion 18. The tubular member and terminal will then be interlocked for the transmission of loads axially and torsionally. The press is next operated to raise the piston 27 and relieve the elastic ring 30 of compression, and the interlocked tubular member with the terminal attached thereto is lifted out of the cylinder. Each terminal is secured to the tubular member in the same manner.

The opposed toroidal grooves in the bottom of the cylinder and face of the piston prevent the rubber in the ring 30, when under the high pressure necessary, from being extruded through the minute clearances between the cylinder and piston and between the bore of the piston and the tubular member. The grooves reduce the tendency of the rubber to funnel into the clearances to a greater extent than if the cylinder, piston face and tubular member meet at right angles. It is possible that the inner edge of the piston face around the groove may also, under pressure of the rubber, spring slightly and closely seal the clearance between the piston and the tubular member. The shallow cylindrical recess 29 in the bottom of the cylinder prevents the rubber from getting under the end of the tube and the shoulder of the terminal and forcing them out of position.

When terminals of smaller diameters are used the corners in the hexagonal faces of portions 16 and 17 may be slightly smoothened or rounded, as at 36, to avoid fracture of the tubing around such corners. When the terminals have larger diameters this is not necessary.

When the terminals have thus been secured in the tubular member they will be locked by their integral portions against heavy axial and torsional loads. No devices such as pins or bolts are necessary. The annular concave portion of the tubular member will grip tightly to the concave portion 18 of the terminal and secure it for axial loads in either direction, and the conformation of the tubular member to the hexagonal portions 16, 17 will effectively secure the terminal against torsional loads.

The showing herein exemplifies a simple and efficient apparatus for attaching terminals to tubular members to be used as operating rods, providing an unusually strong, durable interlock between them which is highly desirable in operating rods used in aircraft. It also exemplifies a simple and effective tubular member with terminals for use as a connecting rod.

The hexagonal contour of portions 16 and 17 exemplifies a desirable shape of the head on the terminal for the circumferential interlock with the deformed tubular member, but it is to be understood that this shape may be modified to irregular or other shapes which produce circumferential interlock for torsional loads.

The invention is not to be understood as restricted to the specific details set forth, since these are exemplary and may be modified within the scope of the appended claims without departing from the spirit and scope of the invention.

Having thus described the invention, what we claim as new and desire to secure by Letters Patent is:

1. In apparatus for fabricating connecting rods which comprise a tubular member and a terminal provided with a peripherally grooved portion for an axial interlock with said member, the combination with a cylinder provided with a substantially cylindrical bore; a rigid seat for holding the tubular member in longitudinally fixed position in the cylinder; a piston slidably fitting in the bore of the cylinder and having a central bore through which the tubular member may be placed on said seat; and an elastic ring having its outer periphery conforming substantially to the bore of the cylinder, and an opening therethrough conforming substantially to the outer periphery of the tubular member and squeezable in the cylinder by the piston for contracting the tubular member into axial interlocking engagement with the stem.

2. In apparatus for fabricating connecting rods which comprise a tubular member and a terminal provided with a peripherally grooved portion for an axial interlock with said member, the combination with a cylinder having a substantially cylindrical bore and provided with a toroidally curved inner end; a rigid seat for holding the terminal and the tubular member in longitudinally fixed position in the cylinder; a piston slidably fitting in the bore of the cylinder, a central bore extending therethrough through which the tubular member may be placed on said seat and the toroidally curved inner end of the cylinder; and an elastic ring having its outer periphery conforming substantially to the bore of the cylinder, and an opening therethrough conforming substantially to the outer periphery of the tubular member and having its ends engaged by the ends of the piston and cylinder, for contracting the tubular member into axial interlocking engagement with the stem.

3. In apparatus for fabricating connecting rods which comprise a tubular member and a terminal provided with a peripherally grooved portion for an axial interlock with said member, the combination with a cylinder having a cylindrical bore and provided at its inner end with a socket for receiving the stem and with a rigid seat for holding the terminal and the tubular member in longitudinally fixed position in the cylinder; a piston slidably fitting in the bore of the cylinder and having a central bore through which the tubular member and the stem may be placed on said seat; and an elastic ring having its outer periphery conforming substantially to the bore of the cylinder, and having an opening therethrough fitting around the outer periphery of the tubular member and having its ends engaged by the inner ends of the piston and cylinder, for contracting the tubular member into axial interlocking engagement with the stem.

4. In apparatus for fabricating connecting rods which comprise a tubular member and a terminal provided with a peripherally grooved portion for an axial interlock with said member, the combination with a cylinder having a substantially cylindrical bore and provided with a toroidally curved inner end and a rigid seat for holding the terminal and the tubular member in longitudinally fixed position in the cylinder and a socket for receiving the stem; a piston slidably fitting in the bore of the cylinder, and having a central bore extending therethrough through which the tubular member may be placed on said seat, and a toroidally curved inner end; and an elastic ring having its outer periphery conforming substantially to the bore of the cylinder, and an opening fitting substantially around the outer periphery of the tubular member and having its ends conforming to the inner ends of the piston and cylinder, for contracting the tubular member into axial interlocking engagement with the stem.

5. In apparatus for fabricating connecting rods which comprise a tubular member and a terminal provided with a peripherally grooved portion for an axial interlock and a polygonal portion for a circumferential interlock with the tubular member, the combination with a cylinder having a substantially cylindrical bore; a rigid seat at the inner end of said cylinder for holding the terminal and the tubular member in longitudinally fixed position in the cylinder; a piston slidably fitting in the bore of the cylinder and having a central bore through which the tubular member may be placed on the seat; and an elastic ring having its outer periphery conforming to the bore of the cylinder, a central opening therethrough fitting around the tubular member, and extended around the portions of the tubular member containing the peripherally grooved and polygonal portion of the stem, for contracting the tubular member around the grooved and polygonal portions of the stem.

6. In apparatus for fabricating connecting rods which comprise a tubular member and a terminal provided with a peripherally grooved portion for an axial interlock and a polygonal portion for a circumferential interlock with the tubular member, the combination with a cylinder having a substantially cylindrical bore and provided with a toroidally curved inner end; a rigid seat at the inner end of the cylinder for holding the terminal and the tubular member in longitudinally fixed position in the cylinder; a piston slidably fitting in the cylinder, and having a central bore through which the tubular member may be placed on the seat, and a toroidally curved inner end; and an elastic ring having its outer periphery conforming to the bore of the cylinder, a central opening therethrough fitting around the tubular member, and ends fitting the inner ends of the piston and cylinder, and extending around the portions of the tubular member containing the peripherally grooved and polygonal portions of the stem, for contracting the tubular member around the grooved and polygonal portions of the stem.

7. In apparatus for fabricating connecting rods which comprise a tubular member and a terminal provided with a peripherally grooved portion for an axial interlock and a polygonal portion for a circumferential interlock with the tubular member, the combination with a cylinder having a cylindrical bore and provided at its inner end with a socket for receiving the stem and a rigid seat for securing the terminal and the tubular member in longitudinally fixed position in the cylinder; a piston slidably fitting in the cylinder and a central bore through which the tubular member may be placed on the seat and the stem; and an elastic ring having its outer periphery conforming to the bore of the cylinder, a central opening therethrough fitting around the tubular member, and having its ends engaged by the inner ends of the piston and cylinder, the ring being extended longitudinally around the tubular member containing the peripherally grooved and polygonal portions of the stem for contracting the tubular member around the grooved and polygonal portions of the stem.

8. In apparatus for fabricating connecting rods which comprise a tubular member and a terminal provided with a peripherally grooved portion for an axial interlock and a polygonal portion for a circumferential interlock with the tubular member, the combination with a cylinder having a substantially cylindrical bore and provided with a toroidally curved inner end and a rigid seat for holding the terminal and the tubular member in longitudinally fixed position in the cylinder and a socket for receiving the stem; a piston slidably fitting in the bore of the cylinder, a central bore through which the tubular member may be placed on the seat, and a toroidally curved inner end; and an elastic ring having its outer periphery conforming to the bore of the cylinder, a central opening therethrough fitting around the tubular member, and having its ends fitting the inner ends of the piston and cylinder, the ring being extended around the tubular member containing the peripherally grooved and polygonal portions of the stem for contracting the tubular member around the grooved and polygonal portions of the stem.

CLYDE E. METHENY.
ALBERT L. MARKER.